United States Patent Office 3,510,675
Patented May 5, 1970

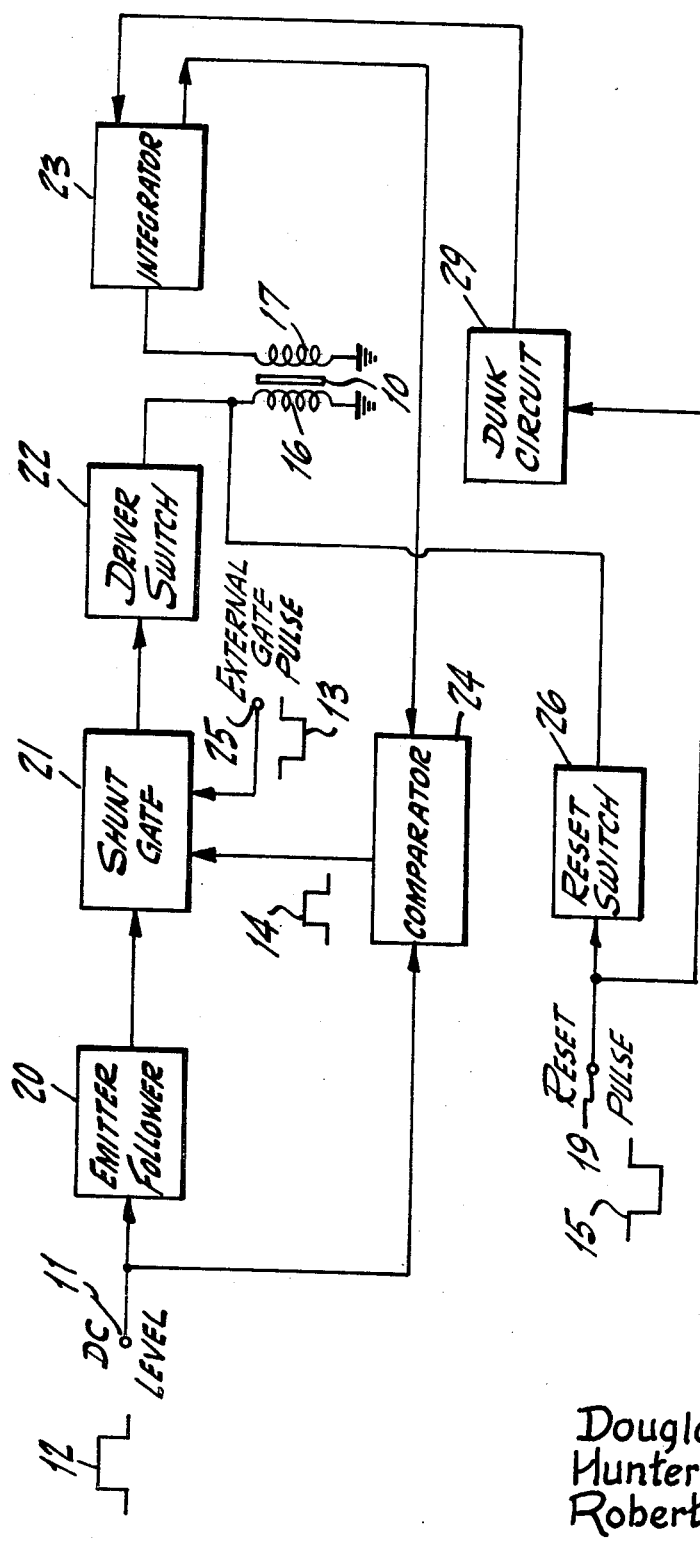

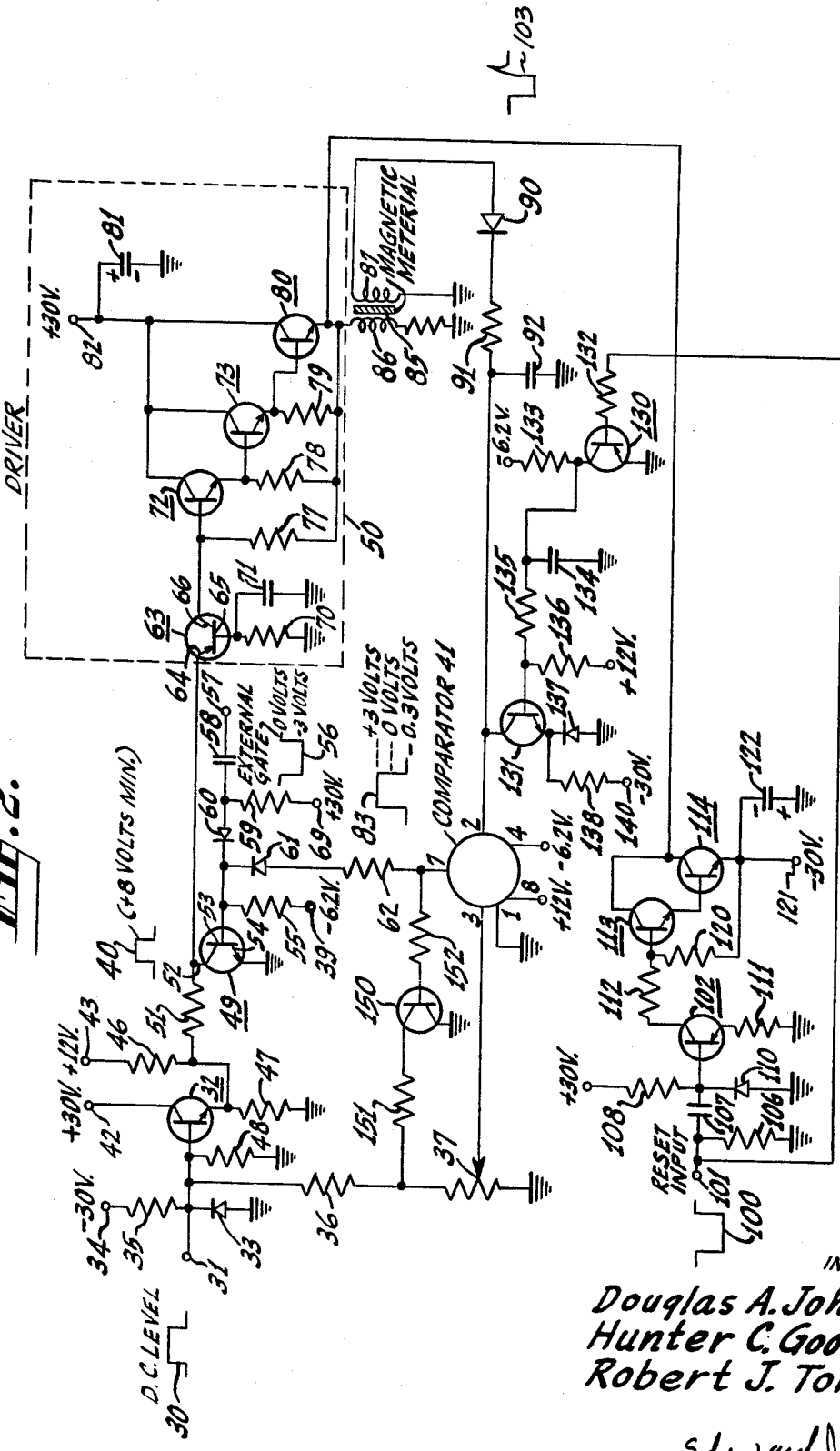

3,510,675
LINEAR FLUX CONTROL CIRCUIT
Douglas A. Johnson, Cinnaminson, Robert J. Tomsic, Cherry Hill, and Hunter C. Goodrich, Collingswood, N.J., assignors to Radio Corporation of America, a corporation of Delaware
Filed Dec. 8, 1967, Ser. No. 689,036
Int. Cl. H01f *13/00*
U.S. Cl. 307—101          9 Claims

ABSTRACT OF THE DISCLOSURE

An improved flux drive circuit is provided for inducing a flux in a magnetic material that is directly proportional to the applied input voltage. This linear control of the flux is provided by controlling the volt-time product applied to the control windings which does not require a constant voltage or constant time but can be used with any combination of voltage and time variations. The drive pulse amplitude E is derived from input voltage level. The induced flux is measured directly at the control windings and the measured output varies the pulse width ΔT to shut off the flux driver when the flux has reached the desired level.

BACKGROUND OF THE INVENTION

This invention relates to a linear flux control circuit and more particularly to a flux driver circuit for inducing a flux in a magnetic material that is directly proportional to the applied input voltage.

A specific application of a flux driver circuit is in the area of phased array beam steering. A magnetic material such as ferrite or garnet is inserted in each element of a phased array antenna to produce, in response to a flux bias in the magnetic material, a given amount of phase shift of a microwave signal transmitted therethrough. The flux driver circuit is responsive to a received D.C. level signal from an outside source, such as a computer programmer, and is used to place a controlled level of remanant flux in the magnetic material to provide the flux bias. The flux induced in the ferrite or garnet material causes a given amount of phase shift of the microwave signal transmitted therethrough in each element so as to control the direction of the main beam of the phased array.

The state-of-the-art flux driver circuits suffer from nonlinearities and temperature induced variations between the control input voltage and the induced flux level. These result from changes in lead length voltage drop due to permeability variations and from changes in transistor offset voltages. This is such a serious problem in antenna beam steering, that frequently multiple phase shifting ferrite cores are used, each being driven into saturation in one direction or another. A linear flux control circuit would eliminate the need for multiple ferrites and control circuits by achieving a high degree of linearity in a single analog flux circuit.

It is an object of this invention to provide a linear flux control circuit.

SUMMARY OF THE INVENTION

Briefly, the above object and other objects of this invention are accomplished by a system for producing a drive pulse to induce a controlled level of flux in a magnetic material. In this system a flux driver circuit is responsive to the amplitude E of the input D.C. voltage level to induce a given flux in a magnetic material. The induced flux is measured directly at the control winding by means of a coupling coil and an integrator circuit to provide an output signal proportional to the flux build-up in the magnetic material. The signal proportional to the flux build-up in the magnetic material is then compared in a feedback loop with the D.C. input voltage level to provide at the output of a comparator a signal which when the desired flux level is reached shuts off the driver circuit. In this manner the output from the integrator is used to vary the time duration or pulse width ΔT of the input D.C. voltage level to compensate for the nonlinearities previously suffered from other flux drivers.

Description of the preferred embodiments of the invention

A more detailed description follows in conjunction with the following drawing wherein:

FIG. 1 is a block diagram of a linear flux control circuit in accordance with one embodiment of the present invention, and FIG. 2 is a schematic diagram of the linear flux control circuit shown in FIG. 1.

Compensation for permeability changes, when necessary, is accomplished by controlling the volt-time product applied to the control winding 16 of FIG. 1. This is readily shown from the relationship between instantaneous winding voltage $e$ and the linked flux $\psi$.

$$e = \frac{d\psi}{dt}$$

Integrating to get a given flux change $\Delta\psi$ we get $$\Delta\psi = \int \frac{d\psi}{dt} dt = \int e\, dt$$

For a rectangular applied voltage the integrated volt-time product can be expressed as EΔT, where E is the amplitude of the applied voltage and ΔT is the pulse width. Ignoring minor effects from leakage inductance, this relationship is independent of the material permeability which permeability varies non-linearly with changes in temperature. Thus the controlled volt-time product approach eliminates a serious source of non-linear flux variation with temperature.

In accordance with this invention, the input D.C. voltage level of the driver pulse 12 (driver pulse amplitude E) is applied to terminal 11. This input D.C. level (amplitude E) of driver pulse 12 is provided by a computer program or the like (not shown) outside of the flux driver circuit. The linear flux control circuit shown in FIG. 1 including the feedback loop comprising the integrator 23 and the comparator 24 varies the time duration of driver pulse width ΔT at the input D.C. level to compensate for the nonlinearities in the flux driver circuit. The application of a reset pulse 15 to terminal 19 causes reset switch 26 to close passing sufficient current at peak levels through coil 16 in a given direction to cause magnetic material 10 to saturate in a given direction. Upon removal of the reset pulse, the current stops and the magnetic material 10 remains in the saturated state. The application of the reset pulse 15 at terminal 19 also allows the dunk circuit 29 to discharge the integrator 23. Following the application of the reset pulse 15 and saturation of the magnetic material, the D.C. voltage level of driver pulse 12 from a control source (not shown) is applied to input terminal 11 and then to emitter follower 20. The output of the emitter follower 20 is coupled to shunt gate 21 and then to flux driver circuit 22. The emitter follower 20 provides isolation between the shunt gate 21 and the input D.C. voltage level applied at terminal 11. An external gate pulse 13 from an outside source (not shown) is applied to terminal 25 and is coupled to shunt gate 21. The leading edge of the external gate pulse 13 opens the shunt gate 21 and permits the input D.C. voltage level of drive pulse 12 of amplitude E to be applied to the driver circuit 22. The driver circuit 22 is responsive to the input voltage level of driver pulse amplitude E to provide the required current gain at the peak current levels to inductor 16 to induce the desired flux into the magnetic material 10 placed in the field of inductor 16. The magnetic material 10 used may be for example a garnet or ferrite. The voltage level at the magnetic material 10 is picked off on the control winding 17 and fed to integrator circuit 23. The integrator circuit 23 provides an integrated output signal proportional to the flux build-up in the magnetic material 10 due to the drive pulse amplitude E. The output of the integrator 23 is coupled in a feedback loop to a comparator 24. A portion of the input D.C. voltage level of driver pulse 12 applied to terminal 11 is coupled to comparator 24. The comparator 24 produces a gate turnoff signal 14 which overcomes the effect of the external gate signal when the output of the integrator 23 reaches the input comparative D.C. voltage level of driver pulse 12. It is this combination of drive pulse amplitude E and width control $\Delta T$ that ensures that the desired flux is obtained in the magnetic material and which can compensate for the nonlinearities that previously existed in a flux driver circuit.

FIG. 2 is a schematic diagram of a circuit suitable for use in the invention. The D.C. voltage level (adjustable from 0 to 30 volts) of a driver pulse 30 from a control source (not shown) is coupled to terminal 31 and is applied to the base of transistor 32 through diode clamp 33 which is biased by bias resistor 35 and by a —30 volt supply voltage (not shown) coupled to terminal 34. The input D.C. voltage level of driver pulse 30 is also attenuated by resistor 36 and potentiometer 37 and applied to pin 3 of an integrated circuit comparator 41 which is part of a feedback loop. The transistor 32 is connected as an emitter follower to provide isolation between the input terminal 31 and a shunt gate provided by transistor 49. The transistor 32 is D.C. biased by a +30 supply voltage (not shown) coupled to terminal 42 at the collector of transistor 32 and a +12 supply voltage (not shown) coupled to terminal 43 in the emitter circuit of transistor 32. The D.C. biasing level determined by resistors 46, 47 and 48 and the +12 volt supply provides a minimum driver signal of approximately +8 volts output to the driver circuit 50 regardless of the D.C. level of the driver pulse applied at terminal 31. The +8 volt D.C. biasing level is required so as to offset the voltage drop through the driver circuit 50 and thereby to ensure operation of the feedback control at low voltage D.C. input levels. For input D.C. levels below this approximate minimum of +8 volts, the flux is predominately controlled by the pulse width $\Delta T$ variations produced by the feedback loop including integrator 91, 92 and the comparator 41. The driver signal output of the transistor 32 is applied through series resistor 51 to a shunt gate provided by transistor 49 and then to the driver circuit 50. This shunt gate provided by transistor 49 controls the input into the driver circuit 50. An external gate pulse 56 generated by an outside source (not shown) is applied to terminal 57 and is coupled through capacitor 58 and diode 60 to the base 53 of transistor gate 49. The external gate pulse 56 is a negative-going pulse of three volts amplitude (—3 volts) and a width in excess of the maximum desired pulse width of the input D.C. voltage level of driver pulse 30. A gate turn-off pulse from pin 7 of the integrated circuit comparator 41 coupled through diode 61 and resistor 62 is also applied to the base 53 of transistor gate 49. The comparator gate turn-off pulse from pin 7 is normally at —0.3 volt. When a comparison is obtained at the comparator 41, the output turn-off pulse switches to a level of +3 volts. In the absence of any turn-off signal and the external gate pulse 56, the transistor 49 across the driver circuit is biased into conduction from the +30 volt supply at terminal 69, shunting the input signal from the output of transistor 32 in series with resistor 51 to ground potential. The presence of the negative-going external gate pulse 56 overcomes the forward bias of transistor 49 and biases the gate transistor 49 off, thereby opening the gate to allow the driver signal from the emitter output of transistor 32 to be applied to the driver circuit 50 rather than shunting to ground.

The positive-going variable pulse width $\Delta T$ driver signal output of transistor 32 when passed through the open gate of transistor 49 is applied through disconnect gate 63 to driver transistors 72, 73 and 80. The transistors 72, 73 and 80 are connected in series as emitter followers to provide enough current gain at the peak current levels to induce in a given direction through coil 86 the desired flux in the ferrite or garnet material 85 placed within the field of the coil 86. The transistor emitter followers 72, 73 and 80 are D.C. biased by resistors 77, 78 and 79 and by the +30 supply voltage (not shown) coupled to terminal 82 at the collectors of these transistors. The disconnect gate provided by transistor 63 precedes the emitter followers 72, 73 and 80 and is used to prevent the reset pulse when applied to coil 86 from reaching the input D.C. voltage level and from turning on the emitter follower drivers 72, 73 and 80. The transistor 63 is A.C. biased to cut-off by resistor 70 and capacitor 71 during the large reverse peak currents of the reset pulse 103. The large capacitor 81 in the collectors of the emitter followers 72, 73 and 80 is used to provide a low impedance source for the large peak currents that flow during the set pulse. The positive-going pulse from the driver 50 is coupled through the coil 86 to the magnetic material 85 and is picked off by coil 87 also in the field of coil 86 and fed through a series diode 90 to an R-C integrator circuit made up of resistor 91 and capacitor 92. The series diode 90 is used to prevent the negative-going reset pulse 103 from affecting the integrated output. The time constant of integrator circuit 91, 92 is made larger than the maximum pulse width $\Delta T$ of the driver signal. The comparator 41 may be an integrated circuit comparator such as F.C.$\mu$A710 made by Fairchild Semiconductor. Using the F.C.$\mu$A710 integrated circuit comparator mentioned above, the pin numbers of the circuit are connected as shown in the schematic of FIG. 2 with pin No. 1 coupled to ground, pin No. 8 to a +12 volt supply voltage (not shown) and pin No. 4 to a —6.2 volt supply voltage. The output of integrator 91, 92 is coupled to pin No. 2 of the above described integrated circuit comparator 41. Attenuated D.C. voltage level 30 coupled to terminal 31 is applied through resistor 36 and potentiometer 37 to pin No. 3 of comparator 41. The attenuation provided by resistor 36 and potentiometer 37 is adjusted so as to scale the reference D.C. level 30 to a comparable level with the output of the integrated level from integrator 91, 92. This adjustment is used to compensate mainly for the attentuation through the integrator circuit 91, 92.

When the voltage from the integrator 91, 92 at pin No. 2 of comparator 41 is equal to the attenuated input D.C. level of driver pulse 30, the comparator output switches from a —0.3 volt to a positive +3 volt level providing a gate turn-off pulse 83 at pin No. 7 having a voltage level of +3 volts which is coupled through diode 61 and resistor 62 to the base 53 of transistor 49 providing forward bias to the gate transistor 49. The forward bias of transistor 49 shunts the signal from the emitter follower transistor 32 to ground potential, disabling the driver circuit 50 and thereby controlling the pulse width $\Delta T$ in response to the measured flux in the magnetic material to compensate for the nonlinearities between applied input voltage and induced flux.

The magnetic material 85 is reset by passing current in an opposite direction from that used to induce the set flux in the magnetic material through inductor 86. Passing current in an opposite direction is accomplished by applying a negative-going reset pulse rather than a positive-going set pulse from a reset pulse generator (not shown) to terminal 101. The negative-going reset input pulse 100 is coupled to transistor 102 through diode clamp 110 and coupling capacitor 107. The inverted output of transistor 102 is coupled to collector followers 113 and 114 which are D.C. biased by a −30 volt supply voltage coupled to terminal 121 at the emitter of transistor 114 and base of transistor 113 through resistor 120. The inverted output from transistor 102 provides enough base current to the collector followers 113 and 114 to drive them into saturation. The negative-going switched output pulse 103 from the collector followers 113 and 114 provides sufficient peak current and voltage pulse to inductor 86 to cause the magnetic material 85 to saturate and thereby upon removal of the pulse 103 the magnetic material 85 remains in a saturated state. The negative-going reset pulse 100 at terminal 101 is coupled to transistor 130 of the dunk circuit. The reset pulse 100 is inverted at the output of transistor 130 and is stretched through R-C network 134, 135 and applied to the base of transistor 131 to switch on the shunt transistor 131 and discharge the integrator circuit capacitor 92 to a clamp voltage determined by diode clamp 137, resistor 138 and −30 volts supply voltage at terminal 140. The reset pulse 100 is stretched to prevent transients due to the driver reset pulse 103 from affecting the zero reference of the integrator.

Since the comparator 41 is highly sensitive to the two input voltage levels, there is a tendency for the comparator to oscillate due to the slight variations in voltage level. To ensure that the comparator 41 switches only once, a one stage transistor 150 that turns on due to the comparator output pulses from pin No. 7 of comparator 41 shunts resistor 151 across the potentiometer 37 to lower the reference voltage and prevent oscillations from occurring.

Typical values for the components of the circuit of FIG. 2 are as follows:

Resistors and potentiometers:
    35, 138—1.5K
    48, 79, 55, 108—10K
    46, 51, 62, 112, 151—680R
    36, 77, 132—2.2K
    59—22K
    47—4.7K
    70—33K
    78—1K
    91—220R
    37—500R
    152—6.8R
    106, 111—47R
    120—68K
    133, 135—3.3K
    136—15K Capacitors:
    71—39 pf.
    58, 92, 107—.1 $\mu$f.
    81, 122—100 $\mu$f.
    134—.0047 $\mu$f.

Transistors:
    32—2N1893
    49, 131—2N1308
    63, 102—2N1132
    72, 150—2N2219
    73, 113—2N1613
    80, 114—2N3445
    130—2N1307

Diodes:
    33, 60, 61, 137, 110—1N914
    90—1N277

This circuit has been built and tested and the results show an excellent flux linearity over an input voltage range of zero to +30 volts. Without the linear circuit, the above linearity is obtainable over a range of only eight to twenty volts. In addition, the inoperative region of zero to four volts which previously existed has been eliminated. In cold temperature tests in the range of +23 to −56° centigrade on the magnetic material, no variation in flux stability is observed. Without the feedback circuit, a flux variation as high as 25% was obtained. While the specific application of the linear flux control circuit is in the area of phased array beam steering wherein the flux induced magnetic material such as a ferrite or garnet produces a proportional phase shift at microwave frequencies, the general application of this circuit is to control the inductance of saturable reactors.

What is claimed is:

1. In a flux driver circuit of the type having a flux driver responsive to a driver input control pulse signal having a D.C. voltage level for inducing a corresponding level of flux in a magnetic material, the improvement comprising: means responsive to the flux induced in said magnetic material for providing a monitored output signal proportional to the quantity of flux present at any instant of time in said magnetic material, and means responsive to said D.C. voltage level of said applied control signal and said monitored output signal for shutting off said driver when said monitored output signal reaches a predetermined proportion of said input D.C. voltage level, whereby the pulse width of the driver pulse is varied to provide an induced flux output in direct proportion to said D.C. voltage level.

2. The flux driver circuit of claim 1, wherein said means for shutting off said driver includes a comparison means responsive to said monitored output signal and said D.C. voltage level of said input drive pulse for producing a comparator output signal when said monitored output signal exceeds a given proportion of said applied D.C. voltage level, and a disconnect gate coupled across the input circuit of said driver and responsive to said comparator output signal being applied thereto for disconnecting said driver input control pulse signal from said driver.

3. The combination of claim 2, wherein said disconnect gate includes a transistor coupled across the input of said driver and an external gate pulse coupled to said transistor for biasing said transistor in a nonconducting state, and wherein said comparator output signal is also coupled to said transistor to bias said transistor in a conducting state to decouple said driver upon conduction only when said output signal reaches said applied input D.C. voltage level.

4. The flux driver circuit of claim 1, wherein said means for providing said monitored output signal includes means for deriving an induced voltage proportional to the instantaneous rate of change in flux in said magnetic material, and means for integrating said induced voltage to thereby provide said monitored output signal.

5. A linear flux driver circuit for inducing a controlled level of flux in a magnetic material in response to an input driver pulse of a D.C. amplitude level comprising:
    a current driver,
    input means responsive to said input driver pulse for coupling said input driver pulse to said current driver,
    a coil placed so that the field of said coil couples said magnetic material,
    said current driver coupled to said coil and responsive to said D.C. level of said driver pulse to provide sufficient current gain through said coil in one direction to induce responding level of flux in said magnetic material,
    a second coil placed in the field of said first-mentioned coil and said magnetic material,
    an integrator circuit coupled to said second coil and responsive to the induced voltage level at said magnetic material to provide at the output of said integrator an integrated output signal proportional to the level of flux induced in said magnetic material,
    means responsive to said integrated output signal and said D.C. level of said driver pulse to provide a driver shut-off pulse to said input means to disconnect said input driver pulse from said current driver whenever the level of said integrated output signal reaches the comparative level of said D.C. level whereby the pulse width of said driver pulse is controlled in response to the induced flux to provide an induced flux output in direct proportion to the input voltage.

6. The combination as claimed in claim 5, including means for resetting said magnetic material by passing sufficient peak current levels in a direction through said coil opposite said one direction to induce a flux of a magnitude sufficient to cause saturation of said magnetic material in an opposite direction.

7. The combination as claimed in claim 6, wherein said resetting means includes means coupled to said integrator circuit for discharging said integrator circuit.

8. The combination as claimed in claim 5, wherein said input means includes a transistor coupled across the input of said driver input and includes an external pulse having duration in excess of the maximum driver pulse width for biasing said transistor into cut-off condition, said transistor responsive to said external cut-off pulse and said shut-off pulse from said comparator to be conductive when said integrated output signal level reaches the equivalent input D.C. reference level.

9. The combination as claimed in claim 5, wherein said current driver includes a second disconnect gate coupled to said first coil and responsive to said sufficient peak currents in said opposite direction to disconnect said driver and said input means from said high peak current.

References Cited

UNITED STATES PATENTS

| | | | |
|---|---|---|---|
| 2,296,764 | 9/1942 | Braden | 307—101 X |
| 3,117,308 | 1/1964 | Sublette | 307—314 X |
| 3,395,351 | 7/1968 | Deise et al. | 307—314 XR |
| 3,401,313 | 9/1968 | Littwin | 317—157.5 |
| 3,418,542 | 12/1968 | Renner | 317—157.5 |

ROBERT S. MACON, Primary Examiner

T. B. JOIKE, Assistant Examiner

U.S. Cl. X.R.

307—235; 323—44, 62